Aug. 15, 1950
P. F. ROSSMANN
2,518,723
FILM FEEDING AND SHUTTER SETTING MECHANISM
FOR PHOTOGRAPHIC ROLL FILM CAMERAS
Filed May 8, 1947
5 Sheets-Sheet 1
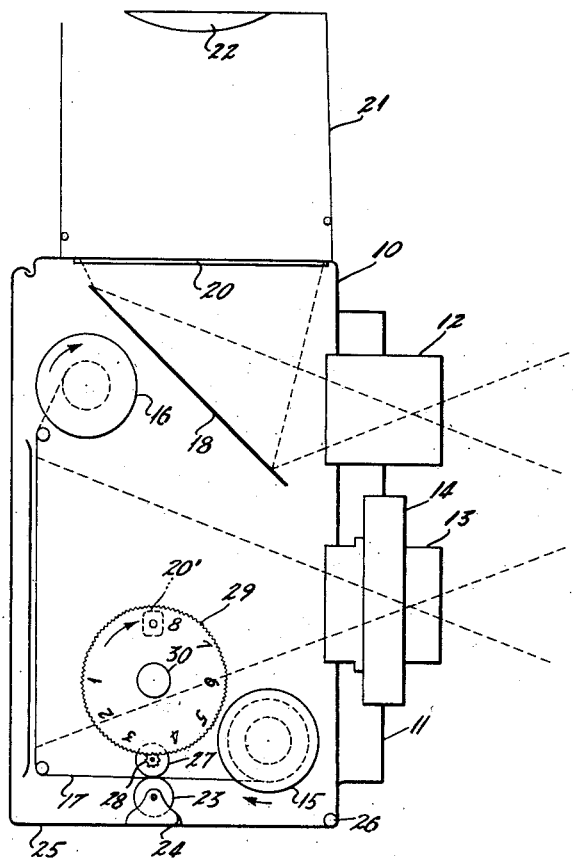
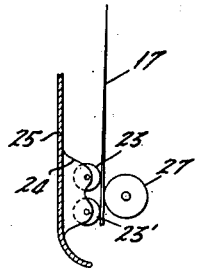
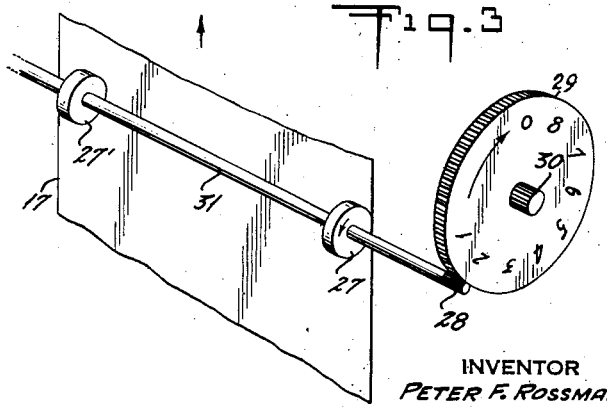
INVENTOR
PETER F. ROSSMANN
BY
*Karl Rau*
ATTORNEY

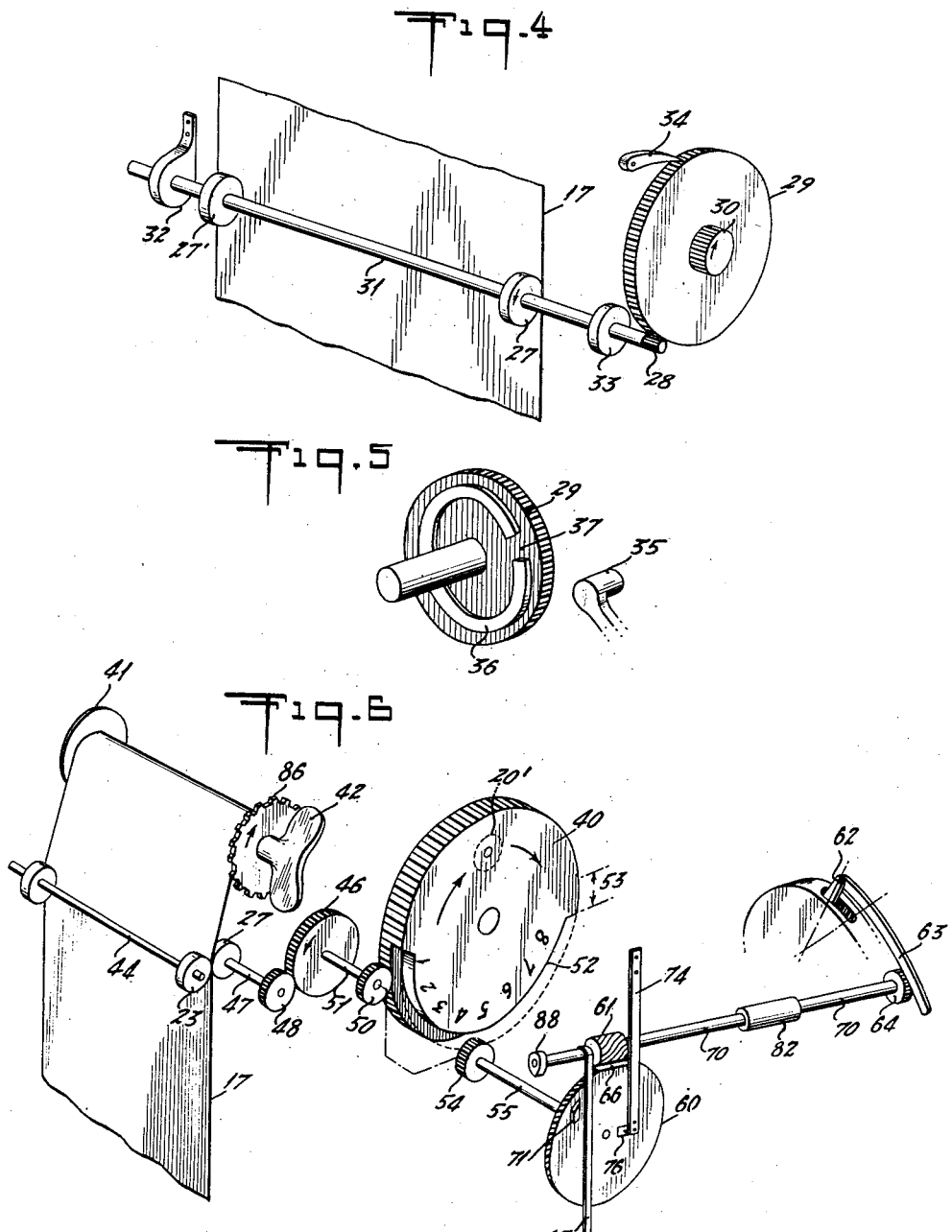

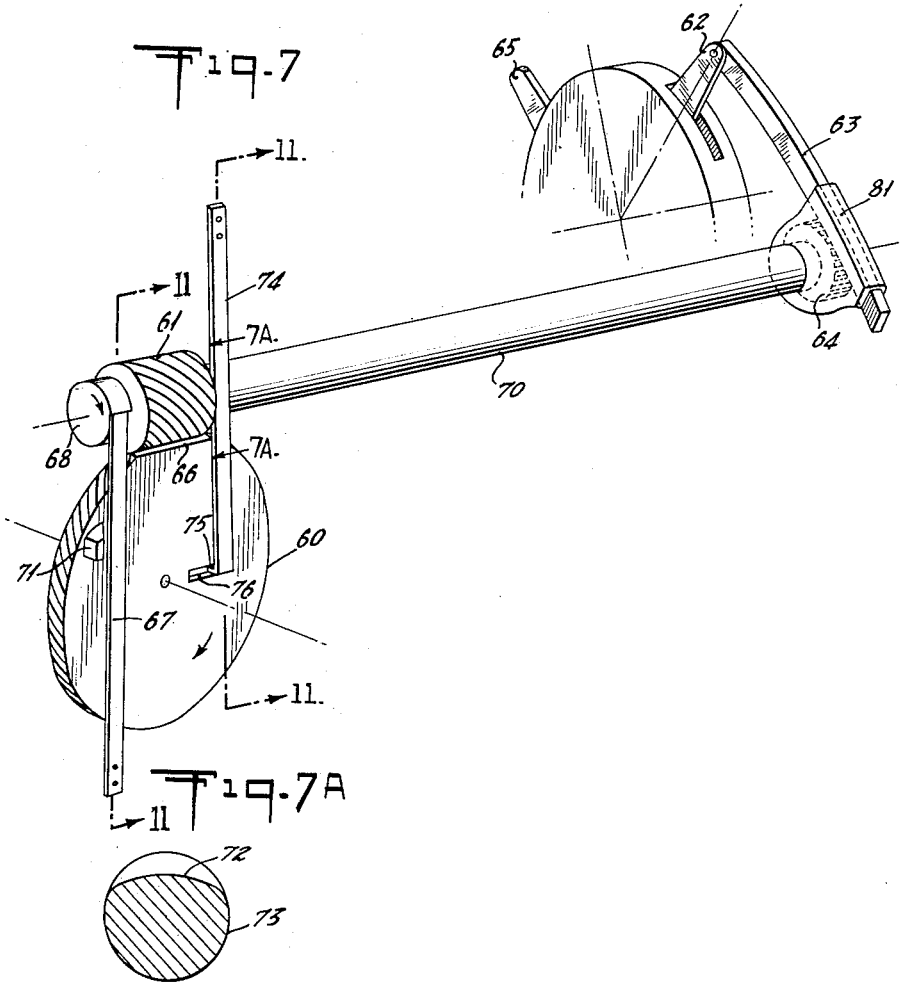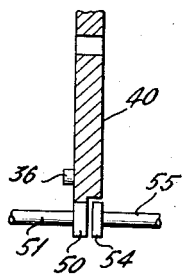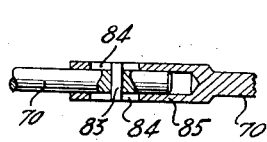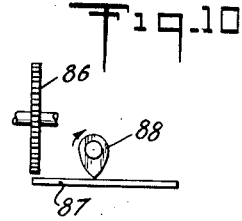

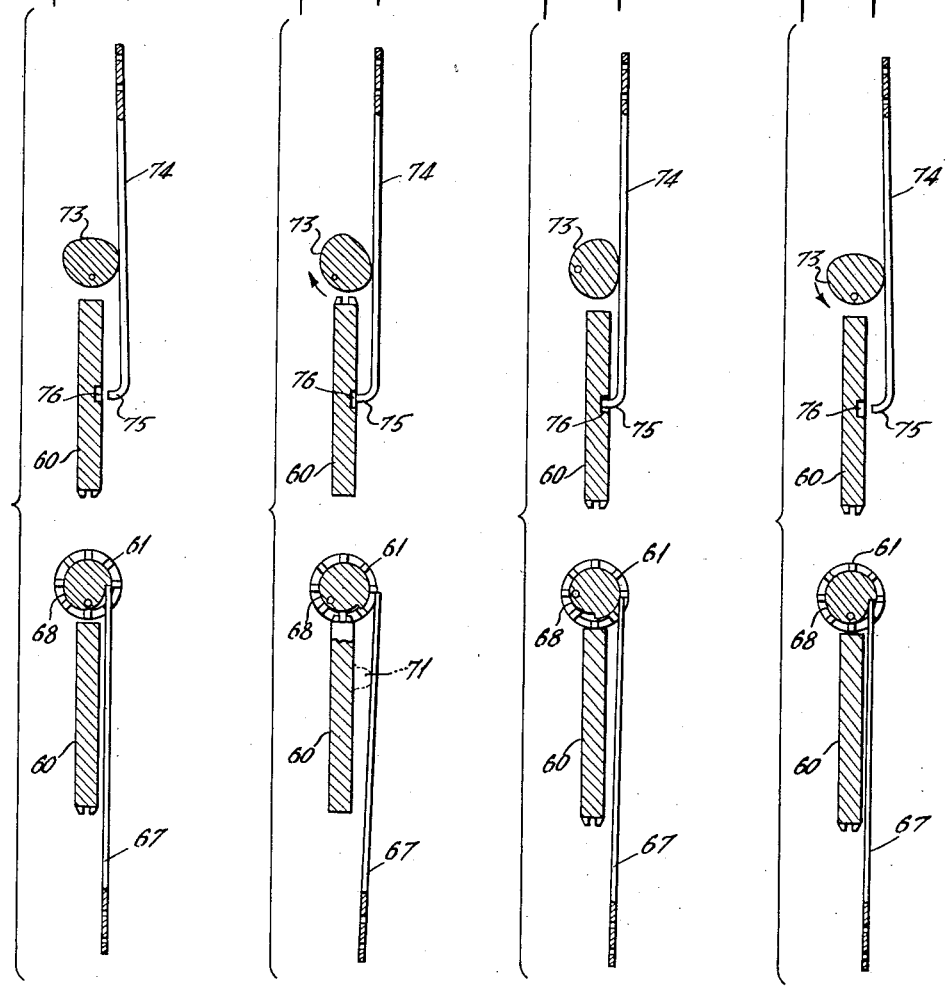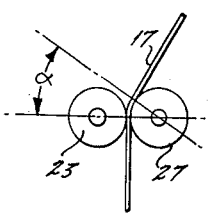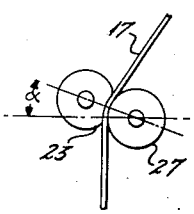

Aug. 15, 1950   P. F. ROSSMANN   2,518,723
FILM FEEDING AND SHUTTER SETTING MECHANISM
FOR PHOTOGRAPHIC ROLL FILM CAMERAS
Filed May 8, 1947   5 Sheets-Sheet 5

INVENTOR.
PETER F. ROSSMANN
BY
ATTORNEY

Patented Aug. 15, 1950

2,518,723

UNITED STATES PATENT OFFICE 2,518,723

FILM FEEDING AND SHUTTER SETTING MECHANISM FOR PHOTOGRAPHIC ROLL FILM CAMERAS

Peter F. Rossmann, Morristown, N. J., assignor of one-half to Karl Rath, New York, N. Y.

Application May 8, 1947, Serial No. 746,703

8 Claims. (Cl. 95—31)

The present invention relates to photographic roll film cameras, more particularly to improvements in the construction of such cameras designed to facilitate and simplify the operation thereof.

Among the objects of the invention is to provide a simple mechanism for indicating the number of exposures made or frames of film exposed, without having to observe the customary red window provided in cameras of known construction.

Another object is to provide a simple interlocking mechanism, whereby the film winding will be locked against further rotation after a new frame of film has been advanced into picture taking position, until the shutter has been released, to prevent so-called blanks or unexposed frames.

Still another object of the invention is to provide an efficient and simple mechanism for locking the shutter of the camera against winding or setting, until a new frame of film has been rotated into picture taking position, to prevent double exposure of the same frame.

Another object is to provide simplified and improved means for winding the shutter of a camera simultaneously while advancing the film to the next frame by a single operation.

Further objects and novel features of the invention will become more apparent from the following detailed description, taken in reference to the accompanying drawings forming part of this specification and wherein:

Figure 1 is a schematic diagram of a twin-lens reflex camera embodying film feed and counter means constructed in accordance with the invention;

Figure 2 is a fractional view showing a modification of the friction coupling of Figure 1;

Figure 3 is an isometric fractional view further illustrating the operation of the film counter according to Figure 1;

Figure 4 is an isometric view similar to Figure 3 illustrating a modified film counter mechanism;

Figure 5 is an isometric fractional view of a counter-wheel according to the previous illustrations to serve as a locking means for the camera back or cover;

Figure 6 is an exploded isometric view of a film friction drive system according to the invention for operating the film counter and simultaneously winding the shutter and including interlocking means for preventing both blank and double exposures;

Figure 7 is an enlarged partial view of Figure 6 more clearly illustrating the shutter setting and film winding interlocking mechanism;

Figure 7A is a section taken on line 7A—7A of Figure 7;

Figure 8 is a cross-section through the counter-wheel of Figures 6 and 7;

Figure 9 is a fractional view showing a sliding coupling arrangement between the shutter and winding mechanism for cameras having an extensible lens and shutter mount;

Figure 10 is a partial view of Figures 6 and 7 illustrating more clearly the operation of certain parts thereof;

Figures 11A to 11D are cross-sectional views through the shutter setting wheel and the interlocking elements of Figures 6 and 7 and illustrating the successive operating cycles in advancing a film frame and winding and releasing the shutter of the camera;

Figures 12A and 12B show suitable friction-wheel constructions for use in connection with the invention;

Like reference characters identify like parts throughout the different views of the drawings.

Figure 13:
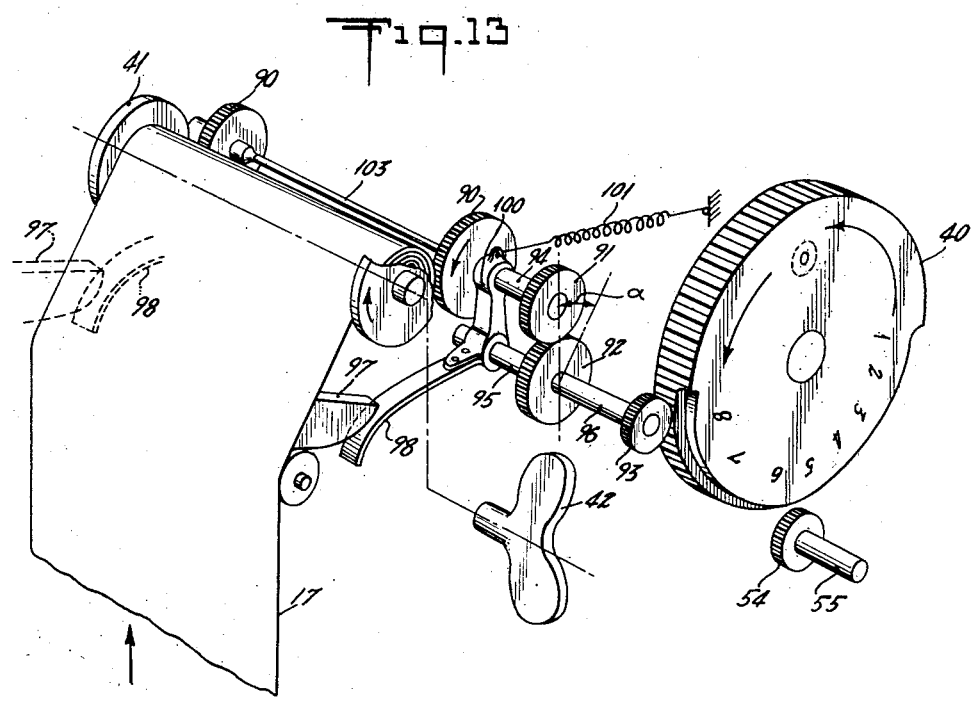
Figure 13 is an exploded isometric view of a modified film friction drive and associated film counter and shutter winding mechanism according to the invention.

Referring more particularly to Figure 1, there is shown schematically a twin-lens reflex camera of well known construction, comprising a body 10, an extensible focusing panel or lens front 11 carrying a finder lens 12 and a picture taking lens 13 provided with a shutter 14, said lens front being slidably mounted in the body 10. There are furthermore shown film supply and take-up spools 15 and 16, respectively, for moving a film 17 over suitable guide rollers across the picture gate in the focal plane of the lens 13 by means of a winding knob or lever coupled with the take-up spool 16, in a manner well known. Numeral 18 represents the reflecting mirror and numeral 20 the ground glass focusing screen. A collapsible focusing hood 21, and inset sharp-focusing magnifier lens 22 complete the general construction of this type of camera well known in the art.

In order to indicate the number of pictures or frames of film exposed, there is provided, according to the present invention, a friction counter comprising a first friction or pressure wheel 23 of either rigid or flexible material and rotatably mounted upon a suitable bracket or support 24 attached to the removable back or cover 25 of the camera shown hinged at 26 to the body 10.

A complementary friction or pressure wheel 27 engaging wheel 23 through the film 17 is mounted upon a suitable shaft rotatably supported by the body 10. The friction wheels 23 and 27 are so designed that, upon closing the back 25 of the camera, the edge of the film 17 will be engaged on both sides by said wheels with sufficient friction to cause said wheels to rotate without a slippage upon rotating or pulling the film 17 from the supply spool 15 onto the take-up spool 16. Friction wheels 23 and 27 are so arranged as to engage only the free edge or margin of the film outside the picture area to prevent damage to the sensitive emulsion within the picture area. There are advantageously provided two pairs of wheels 23 and 27 at the opposite sides of the film and mounted upon common shafts, as shown in Figures 3 and 4, to increase the friction driving force between the film and pressure wheels.

The shaft of the friction wheel 27 terminates in a pinion 28 which meshes with a counter or indicator wheel 29 carrying a series of spaced frame numbers, 1 to 8 in the example shown, which correspond to the number of frames or pictures of the particular film used. Said numbers are so arranged as to appear in succession in a window 20' in the side wall of the camera as the film is advanced from one to the next frame. The diameter of the wheels 23 and 27 and the transmission ratio between the pinion 28 and indicator wheel 29 are so chosen as to result in a suitable angular movement between successive frame numbers, the design being advantageously such that the distance between numbers 0 and 1 corresponds to the length of the paper leader preceding the film in the standard roll film spools. Numeral 30 represents a resetting knob for setting the counter or indicator wheel to its initial position with the number 0 appearing in the viewing window 20, prior to loading the camera with a new film.

In order to furthermore determine the initial position of the indicator wheel 29 relative to the film, the latter upon manually passing the beginning of the paper leader of a new spool 15 through the film gate and fastening its end to the take-up spool 16, is wound upon the latter to a definite extent determined by the usual index mark in the form of a white line or the like upon the paper leader coinciding with a stationary mark or index upon the camera body. The cover 25 is then closed, whereupon with the indicator wheel 29 set to the zero position, winding of the film so that number 1 appears in the viewing window 20' will result in the proper positioning of the first frame in the picture gate of the camera ready for the first exposure. After the first picture has been exposed, the film is advanced to the next number and so on until all the frames have been exposed, whereupon the trailing paper end of the film is completely unwound prior to removal of the film from the camera.

An advantage of the above-described friction counter is due to the fact that positive and efficient friction is insured at all times without the danger of slippage, due to the pressure being applied to the friction wheels 23 and 27 by the hinged cover or back 25. If desired, the friction wheels 23 and 27 may be spring loaded, such as by a flexible mounting of the wheel 23 or bracket 24.

According to an improved and modified construction, as shown by the partial diagram of Figure 2, two adjacent friction wheels 23 and 23' are spaced and mounted upon the cover 25 on opposite sides of the friction wheel 27.

Figure 3 is an isometric view showing more clearly a pair of friction wheels 27 and 27' engaging the opposite edges of the film 17 for driving the counter or indicator wheel 29.

In the arrangement shown in Figures 1 and 3, the resetting of the counter wheel 29 to the zero position must be completed before the camera is closed, so as not to interfere with the initial film position adjustment in the manner described. According to a modified construction as shown in Figure 4, the zero setting of the indicator 29 may be carried out in either the open or closed position of the camera, without interfering with the initial film position adjustment. For this purpose, the driving shaft 31 of the friction wheels 27 and 27' is prevented from rotation in one direction, in the example shown the clockwise direction, by means of a suitable uni-directional clutch or bearing 32, such as a ratchet, wedge, or sprag clutch of any construction known in the art and mounted upon or attached to the camera body. A similar uni-directional clutch 33 connecting the driving shaft 31 with the pinion 28 prevents rotation of the latter in counterclockwise direction, thus permitting setting of the indicator wheel 29 to the zero position without disturbing the remaining mechanism. A ratchet 34 allowing rotation of the indicator wheel 29 and setting knob 30 in an anti-clockwise direction only completes this structure.

An alternative method of insuring proper zero setting of the counter wheel 29 and at the same time preventing accidental opening of the camera and consequent fogging of the film in the camera prior to the exposure of a complete film roll, consists in utilizing the indicator wheel 29 as a locking means in conjunction with a locking pin or lever 35 attached to the cover or back of the camera, as shown in Figure 5. In the latter, the rear surface of the indicator wheel 29 is provided with a rim or annular projection 36 having a slot 37 which must be positioned at the zero setting of the indicator wheel before the camera can be opened. When closing the camera, pin 35 attached to the back or cover of the camera will pass through slot 37 and will be locked by rim 36 while the film is advanced from the supply to the take-up spool. In other words, this arrangement compels the operator to set the indicator to the zero position, before the camera can be closed after insertion of a new film. At the same time, the arrangement provides an efficient lock for the cover 25, as is understood.

Referring to Figures 6 to 11, there is shown a film feeding and counter mechanism used for simultaneously setting or winding the shutter of the camera. Moreover, interlocking means are provided for preventing rotation of the film to the next frame or section until after the shutter has been released or a picture taken to avoid so-called blanks or unexposed frames, and also for preventing setting of the shutter until after the film has been advanced to a new unexposed frame to avoid double exposures of one and the same section of film.

In Figure 6, the film indicator 40 similar to the indicator 29 of the preceding figures is driven by the film friction wheel 27 engaged by the film 17 when the latter is wound upon the take-up spool 41 by means of the film winding key 42. The complementary friction or pressure wheel 23 mounted upon the camera back by means of a shaft 44 may be similar to that described with reference to Figures 1 and 2. A second pair of pressure wheels at the opposite side of the film may be provided in the manner mentioned above. Figure 12A shows how the film wrap on wheel 27 may be obtained, angle a indicating the amount of wrap, while Figure 12B discloses a construction in which the pressure wheel 23 is of resilient material to increase the friction driving effect of wheel 27.

Gear 46 of Figure 6 is driven by friction wheel 27 through shaft 47 and gear 48. The ratio between gears 48 and 46 is such that, for example, wheel 27 and gear 48 make three revolutions for each film frame advance movement and gear 50 which is connected to gear 46 through shaft 51 makes one revolution for each film frame advance, i. e. the transmission ratio between gears 48 and 46 is 1:3. Gear 50 engages the toothed indicator or counter disc 40 which is partly cut away to provide a sector-shaped peripheral recess 52, or mutilated gear section, as shown in the drawing. The cut-away section 52 extends over an arc covering the scale of film frame numbers 1 to 8, with the number 0 being equally spaced from or located midway between numbers 1 and 8. The clockwise rotation from 1 to 0 corresponds to the amount of winding of the film paper leader to bring the first frame into position for exposure. This position also brings portion 53 of the gear teeth of the mutilated section of disc 40 into engagement with a gear 54. Gear 54 drives, through shaft 55, the shutter setting and film winding interlock system shown on an enlarged scale in Figure 7 and described in detail in the following. A cross-sectional view through the counter wheel 40, gears 50 and 54 is shown in Figure 8.

A helical driving wheel 60 is mounted upon the end of shaft 55 and is so designed as to make one revolution for each frame of film being advanced from the supply to the take-up spool. This is obtained by designing gear 54 to be equal to gear 50 in the example given hereinabove. Wheel 60 is of special construction having gear teeth of extremely low helix angle so as to impart a 90° rotation to a further driven helical wheel 61 of extremely high helix gear angle and having an axis forming a right angle with the axis of wheel 60. Hence, the ratio of relative rotation of wheels 60 and 61 is 4:1. Driven wheel 61 serves to operate the shutter setting mechanism which comprises the setting or winding lever 62 to which is secured an arcuate winding rack 63 cooperating with a driving gear 64 mounted upon one end of the shaft 70 of gear 61. The shutter may be of the type having a single setting lever 62 which, in the angular position shown, is in the normal or unset position and is moved through a definite angular distance into the set position. The same lever may serve for releasing the shutter by moving it back to its initial position or a separate release lever 65, Figure 7, may be provided, these and other details being well known to those skilled in the art. The gear teeth of the driven wheel 61 are non-reversible and mesh with the teeth of the driven wheel 60. This non-reversible feature of wheel 61 has the advantage that the shutter elements 62 to 65 cannot be tampered with to cause an out-of-phase condition after wheel 60 has been given a partial rotation.

The helical driving wheel 60 is mutilated or flattened at 66 so that the driven wheel 61 is free to rotate from the set to the released shutter position after the shutter has been wound and is released for taking a picture. As shown more clearly in Figure 7, shutter latch 67 engages a ratchet 68 on the opposite end of shaft 70 of wheel 61, whereby to prevent setting of the shutter before the film has been wound to the next frame. Latch 67 is released by a cam 71 on the flat side of wheel 60 to coincide engagement of the teeth of driving wheel 60 at the edge of flat 66 with the teeth of driven wheel 61. Surface 72 of a further cam 73, Figure 7A, mounted upon shaft 70 on the opposite side of wheel 61 from ratchet 68 permits a film wind latch 74 to lock wheel 60, after the film has been wound to the next frame section and the shutter has been set, through engagement of prong 75 of latch 74 in slot 76 of wheel 60. When the shutter is released, shaft system 70 through a spring mechanism (not shown) returns to the unset position, thereby rotating cam 73 to lift prong 75 through latch 74 from slot 76 so as to permit wheel 60 to be rotated for advancing the next film frame. At the point of cycling when cam 73 has returned to the unset shutter position, shutter latch 67 has returned into engagement with ratchet 68. Both latches 67 and 74 are of spring material and held by tension in their respective locking positions, their release being effected by cams 71 and 73, respectively.

The partial cross-sections through the cam 73, ratchet 68 and end views of driving wheel 60 as shown in Figures 11A, 11B, 11C and 11D further illustrate the successive positions and coincided movements of the cams 68 and 73 and latches 67 and 74 of the interlocking mechanism, as well as the bi-directional spring back rotation of the shaft system 70. Figure 11A shows the starting position, Figure 11B the one-half turn position, Figure 11C the shutter setting position and Figure 11D the released shutter position. In the one-half or 45° position, Figure 11B, the cam 71 is shown out of position, in that it actually has already passed this position and latch 67 is riding upon the surface of cam 68.

Figure 11A shows the starting position with the prong 75 of the film wind latch 74 disengaged from the driving wheel 60 to allow winding of the film to the next frame, and with the shutter latch 67 engaging the ratchet 68 on the shutter winding shaft 70 to lock the shutter against winding. Figure 11C shows the end position after the film has been advanced to the next frame with the wheel 60 having been rotated by a complete revolution and the prong 75 of the film wind latch 74 engaging slot 76 of wheel 60 due to the 90° rotation of cam 73 upon the shutter winding shaft 70. In the position shown, the latch 67 engages the cam surface or ratchet 68, after having been unlocked at the beginning of the film winding operation by the cam 71 upon the driving wheel 60. Figure 11B shows the intermediate position of the driving and driven members corresponding to a 180° rotation of wheel 60 and 45° rotation of wheel 61. At the end of the position shown in Figure 11C, both the film has been wound to the next frame and locked in this position and the shutter has been set in a manner understood from the foregoing. Driven wheel 61 being opposite the flat portion 66 of the driving wheel 60 is disengaged from the latter, so that the shutter may now be released for taking a picture. After the shutter has been released, it will return to the unset position, whereby shaft 70 and wheel 61 will be rotated by spring action (not shown) in the opposite direction as indicated by the arrow and shown in Figure 11D, i. e. cam 73 will release the film wind latch 74 from its locking position and cam 68 will lock the shutter latch, thus restoring the mechanism to the position according to Figure 11A ready to start a new operating cycle.

It should be noted that the rotation of wheels 60 and 61, and the rotation of the shutter winding rack 63 are not limited as shown. Thus, wheel 60 may be rotated in a counterclockwise direction and by reversing the hand of the helix angle of wheel 61, the latter will continue to rotate as shown, i. e. in a clockwise direction. Also, by placing gear 64 above rack 63, the direction may be reversed to suit any existing conditions and requirements. Driving wheel 60 is assumed to rotate in one direction only, as indicated by the arrow, which corresponds to the winding direction of film 17, movement in the opposite direction being advantageously prevented by means of a uni-directional clutch between the winding key and take-up spool or by any other suitable means.

The use of a rack and pinion drive 63—64 for the shutter setting as shown has the advantage of easy adaptability to existing shutter constructions in that the angle of inclination of the rack 63 may have any suitable value, the meshing relation with the pinion 64 being maintained by means of a suitable frame or casing 81 serving as a support for the shaft 70 as well as a guide for the rack 63. The zero position of the indicator wheel 40 in this case may be interlocked with the closing and opening position of the camera cover 25 in substantially the same manner as described hereinabove.

If the shutter is mounted upon an extensible front such as shown in Figure 1, a suitable yielding or sliding joint 82, Figure 6, may be inserted in the driving shaft 70, a cross-section of which is shown more clearly in Figure 9. The latter shows a key 83 fitted to one end of the interrupted shaft 70 and operating in slots 84 of the bored portion 85 of the opposite end of shaft 70. As is understood, any other type of sliding or yielding joint allowing a movement of the shutter in a direction parallel to the shaft 70 may be employed for the purpose of the invention.

In the foregoing, it has been shown how the initial rotation of spool 41 operates the indicator wheel 40 from the "0" to the frame "1" position, i. e., until the first film frame has been rotated into place, and how the gear portion 53 of wheel 40 acts to set the shutter by means of elements 54 to 64 for the first film frame. After the last frame has been rotated into position, i. e. when the number 8 appears in the viewing window 20' and the shutter has been set in the manner described, the gear engagement of the indicator wheel 40 with gear 54 and the shutter setting mechanism is cut off by the start of the cut-away portion 52 and the balance of the spool rotation, i. e., between the number "8" and "0" position of the indicator wheel, results in winding up the film and paper trail upon the spool.

It should be noted that the dimension shown for the initial wind, frame numbers and final wind-up on the indicator wheel 40 are merely approximate and for purposes of illustration only. The operation also presupposes proper instructional care as to the insertion of and winding of the film leader upon the spool 41 prior to closing the camera or the number of preliminary turns prior to mounting the spool in the camera. If the initial film position, before closing the camera is attained by winding the inserted spool until a mark or the like upon the paper leader coincides with a mark or index upon the camera body, a suitable clutch or free wheeling arrangement may be provided disengaging the indicator wheel and shutter winding mechanism as long as the camera is in open position.

In the film wind and shutter setting mechanism above described, gears 50 and 54 make one revolution per frame by virtue of their simultaneous engagement with the gear teeth of the indicator wheel 40. In the event that the approximate gear ratios between gear 50 and indicator wheel 40 result in an impractical diameter, added gear reductions may be interposed between wheel 40 and gear 50; however a similar gear train must be inserted in this case between gear 54 and indicator wheel 40.

In an automatic film wind and shutter setting and interlocking mechanism operated by friction with the film, the danger may exist of winding the film beyond one frame by exerting the added winding force necessary to overcome the friction between the pressure wheels 27 and 23, i. e., in other words by forcefully pulling the film through said wheels in the locking position of the film advance mechanism. In order to forestall such a possibility, the friction wheels 23 and 27 may be so designed such as by providing them with knurled or toothed surfaces suitably inter-engaging each other, as to practically prevent any slippage even when applying considerable driving force by way of the winding key 42.

According to an alternative construction, as more clearly shown in Figure 6 and Figure 10, the winding key 42 carries or drives a toothed wheel 86 engaged by a resilient latch 87, Figure 10, in the wound position of the film before the shutter has been released. For this purpose, latch 87 cooperates with a cam 88 mounted at the end of the shutter winding shaft 70 and being so designed as to allow latch 87 to engage a slot between two successive teeth of the locking wheel 86 in the 90° rotational position of the shaft 70 at the end of the film winding and shutter setting operation, Figure 11C. In this manner, a forceful continued film winding is prevented. After the shutter has been released, return of shaft 70 to its initial position will cause disengagement of latch 87 from wheel 86 by the action of cam 88 (see position shown in Figure 10), thus allowing the starting of a new film winding and shutter setting operation.

In an automatic film feeding and shutter interlock system of the above type, the drive for operating the film feeding and counter and for setting the shutter is directly derived from the film itself. This has the advantage that the operating movements for each feeding and shutter tensioning cycle are exactly alike and no provision has to be made for the varying rotational movement of the supply or take-up spool in rotating successive equal film sections into picture taking position. This not only results in substantial simplification of the entire mechanism, but also in an increased ease of operation in that the winding key or handle has to be moved in a single forward direction only until arrested each time when a new film section has arrived in picture taking position. The only precaution necessary to insure satisfactory operation is to provide adequate means to prevent slippage of the film in the manner pointed out hereinabove. In an especially advantageous embodiment of the invention in the case of using perforated film, the friction rollers may take the form of suitable sprocket wheels engaging the film perforations, in which case a reliable and efficient drive by the film will be insured under all circumstances.

In the automatic film wind and shutter setting interlock system described hereinabove, the friction wheels engage the outer marginal portions of the film to prevent damage to the emulsion within the emulsion or picture area. According to an alternative embodiment of the invention, as shown in Figure 13, the indicator wheel is driven by one or more friction wheels engaging the back of either the film supply or take-up rolls, said friction wheels being in turn subjected to sufficient pressure by a pressure applying mechanism operated by the removable cover or back of the camera.

Thus, referring to Figure 13, the indicator wheel 40 is driven by a pair of pressure or friction wheels 90 mounted upon a common shaft 103 and engaging the back of the film roll upon the take-up spool 41. Friction wheels 90 drive the indicator 40 through gears 91, 92 and 93 having shafts 94 and 96, respectively. The pressure on the back of the film roll by the wheels 90 is applied by a lug 97 mounted upon the back or cover of the camera and contacting a leaf spring 98 which rotates a lever 100, carrying a bearing for the shaft 94, in a counterclockwise direction in the example shown, thereby bringing and keeping the wheels 90 in close frictional contact with the back of the film roll upon closing the cover of the camera. Lever 100 is free to rotate an extension 95 of shaft 96 which carries the driving gear 93 for the indicator wheel 40, independently of the rotation of shaft 96. This lever construction acts to keep gears 91 and 92 in mesh, while the center line of shaft 94 and gear 91 rotates through an arc a either when the radius of the film roll increases, thereby deflecting spring 98 further from the initial or closed cover position, or when spring 101 acting on lever 100 rotates the lever 100 through an angle when the camera cover is open and lug 97 is out of contact with spring 98. In the latter position the wheels 90 are out of engagement with the film roll when the radius of the latter is a maximum or when the entire film has been exposed and is ready for removal from the camera.

Although two lugs 97, two leaf springs 98 and two friction wheels 90 have been shown, one of each may suffice, as is understood. In addition, it should be noted that shaft 94 has a reduced diameter at 103 in order that the lever 100 may be free to accommodate the variations in manufacuring and/or variations in the radius between wound and unwound conditions of the film spools. A flexible joint may be used to accomplish the same purpose. The indicator wheel 40 is substantially of like construction as shown in the preceding embodiments. This wheel may drive a shutter winding and interlock mechanism by way of gear 54 and shaft 55 in substantially the same manner as described hereinbefore and shown in Figure 6.

While there has been shown and described a desirable embodiment of the invention, it is understood that this disclosure is for the purpose of illustration and that various changes in shape, proportion and arrangement of parts, as well as substitution of equivalent elements for those herein shown and described, may be made without departing from the spirit and scope of the invention, as defined by the appended claims. The specification and drawings are accordingly to be regarded in an illustrative rather than a limiting sense.

I claim:

1. In a photographic roll film camera having shutter winding and release means and film winding means for winding a film from a supply spool onto a take-up spool, the combination which comprises a counter disc provided with film frame numbers, driving means between said disc and the film including at least one rotatable element in driving engagement with the film, a mutilated gear carried by said disc, a shutter driving gear meshing with said mutilated gear during the successive film winding movements and being disengaged during the unwinding of the leader and trailer sections of the film, upon initially inserting a film spool and threading the beginning of the leader section upon the take-up spool in the camera, a first mutilated helical gear driven by said driving gear and adapted to perform a complete revolution during the winding of the film from one to the next frame position in the camera, a second helical gear meshing with said first helical gear and adapted to perform a fractional revolution during one revolution of said first helical gear, coupling means between said second helical gear and said shutter winding means for winding the shutter simultaneously with each film winding movement, said second helical gear disengaging said first helical gear in the end positions of successive film winding movements to enable return to released position of said shutter winding means, first locking means to lock said first helical gear in the end positions of successive film winding movements and cooperating cam means therefor carried by said second helical gear for unlocking said locking means in the released shutter positions, and second locking means to lock said second helical gear in the released shutter positions and cooperating cam means therefor carried by said first helical gear for unlocking said second locking means upon initiation of a film winding movement.

2. In a photographic roll film camera having shutter winding and release means and film winding means for winding a film from a supply spool onto a take-up spool, the combination which comprises a mutilated gear, driving means between said gear and the film including at least one rotatable element in driving engagement with the film, to effect substantially a full revolution of said gear during the complete winding of the film from the supply spool onto the take-up spool, a shutter driving gear meshing with the first gear during the successive film winding movements and being disengaged from said first gear during the unwinding of the leader and trailer sections of the film, a first mutilated helical gear having a relatively low helix angle and driven by said driving gear to perform a complete revolution during the winding of the film from one to the next frame position in the camera, a second helical gear having a relatively high helix angle and meshing with said first helical gear to perform a fractional revolution during one revolution of said first helical gear, coupling means between said second helical gear and said shutter winding means for winding the shutter simultaneously with each film winding movement, said second helical gear disengaging said first helical gear in the end positions of successive film winding movements to enable return of said shutter winding means to released position, first locking means to lock said first helical gear in the end positions of successive film winding movements and cooperating cam means therefor carried by said second helical gear for unlocking said locking means in the released shutter positions, and second locking means to lock said second helical gear in the released shutter positions and cooperating cam means therefor carried by said first helical gear for unlocking said second locking means upon initiation of a film winding movement.

3. In a photographic roll film camera having shutter winding and release means and means for winding a film from a supply spool onto a take-up spool, the combination which comprises a first mutilated gear, driving means between said gear and the film including at least one rotatable element in driving engagement with the film, to effect substantially a full revolution of said gear during the winding of the complete film from the supply spool onto the take-up spool, a shutter driving gear meshing with said first gear during the successive film winding movements and being disengaged from said first gear during the unwinding of the leader and trailer sections of the film, a second mutilated gear driven by said driving gear to perform a complete revolution during the winding of the film from one to the next frame position in the camera, a control gear meshing with said second mutilated gear, coupling means between said control gear and said shutter winding means for winding the shutter simultaneously with each film winding movement, said control gear disengaging said second mutilated gear in the end positions of successive film winding movements to enable release of the shutter, first locking means to lock said second multilated gear in the end positions of successive film winding movements and cooperating cam means therefor carried by said control gear for unlocking said locking means in the released shutter positions, and second locking means to lock said control gear in the released shutter positions and cooperating cam means therefor carried by said second mutilated gear for unlocking said second locking means upon initiation of a film winding movement.

4. In an arrangement as claimed in claim 1, wherein said first helical gear has a relatively small helix angle and said second helical gear has a relatively high helix angle and wherein said first locking means consists of a resilient pawl adapted to engage a slot in said first helical gear and said second locking means consists of a resilient pawl engaging a ratchet cam carried by said second helical gear.

5. In an arrangement as claimed in claim 3, a removable cover for said camera, said driving means comprising at least one friction driving wheel engaged by the film, and resilient pressure means carried by said cover and adapted to effect friction driving connection betwen said wheel and film in the closed position of said cover.

6. In an arrangement as claimed in claim 3, a casing and removable cover for said camera, said driving means comprising a pair of complementary friction wheels arranged at opposite sides and engaging the edge of the film, one of said friction wheels being mounted upon said casing and the other friction wheel being mounted upon said cover, whereby to effect friction driving engagement with said film in the closed position of said cover.

7. In an arrangement as claimed in claim 3, wherein said driving means comprises at least one friction driving wheel engaged by the film, and further locking means comprising cooperating locking elements carried by said film winding means and said control gear, respectively, to lock said winding means at the end of successive film winding movements and to unlock said winding means upon return of said control gear to the released shutter position.

8. In an arrangement as claimed in claim 3, wherein said driving means comprises at least one friction driving wheel engaged by the film, a ratchet wheel carried by said film winding means, and a pawl engaging said ratchet wheel and actuatable by a cam carried by said control gear, to lock said winding means at the end of successive film winding movements, and to unlock said winding means upon return of said second helical gear to released shutter position.

PETER F. ROSSMANN.

REFERENCES CITED

The following references are of record in the file of this patent:

UNITED STATES PATENTS

| Number | Name | Date |
|---|---|---|
| 1,177,921 | Brophy | Apr. 4, 1916 |
| 1,493,334 | Fielding | May 6, 1924 |
| 2,126,324 | Harmon et al. | Aug. 9, 1938 |
| 2,161,941 | Zapp | June 13, 1939 |
| 2,169,548 | Zapp | Aug. 15, 1939 |
| 2,237,887 | Nerwin | Apr. 8, 1941 |
| 2,289,827 | Crumrine | July 14, 1942 |
| 2,301,956 | Kuppenbender et al. | Nov. 17, 1942 |
| 2,304,887 | Crumrine | Dec. 15, 1942 |
| 2,358,327 | Harris | Sept. 19, 1944 |